United States Patent
Bin Ahmad et al.

(10) Patent No.: US 11,409,969 B2
(45) Date of Patent: Aug. 9, 2022

(54) METHOD, SYSTEM, AND APPARATUS FOR AUTOMATED DISPENSING OF LABELS IN A PRODUCTION ENVIRONMENT

(71) Applicant: Dell Products L.P., Round Rock, TX (US)

(72) Inventors: Mohd Noor Affendy Bin Ahmad, Pulau Pinang (MY); Muizzuddin Bin Mohd Fauzi, Pulau Pinang (MY); Mohamad Haziq Bin Zabbah, Pulau Pinang (MY); Hamidi Bin Daud, Pulau Pinang (MY)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 16/894,530

(22) Filed: Jun. 5, 2020

(65) Prior Publication Data

US 2021/0383079 A1 Dec. 9, 2021

(51) Int. Cl.
*G06K 7/00* (2006.01)
*G06K 19/07* (2006.01)
*G07G 1/00* (2006.01)
*H04B 5/00* (2006.01)
*G08B 13/24* (2006.01)

(52) U.S. Cl.
CPC ....... *G06K 7/0008* (2013.01); *G06K 19/0723* (2013.01); *G07G 1/009* (2013.01); *G08B 13/2417* (2013.01); *H04B 5/0062* (2013.01)

(58) Field of Classification Search
CPC .. G06K 17/00; G06K 19/0723; G06K 7/0008; G06Q 20/045; G06Q 20/203; G06Q 20/208; G07F 17/42; G07G 1/009; G07G 5/00; H04B 5/0062; G08B 13/2417
See application file for complete search history.

(56) References Cited

U.S. PATENT DOCUMENTS

| | | | |
|---|---|---|---|
| 6,471,815 B1 | 10/2002 | Mace | |
| 6,994,229 B2* | 2/2006 | McTague | G07F 11/68 221/9 |
| 2007/0030153 A1* | 2/2007 | Jessup | G06K 1/18 340/572.1 |
| 2018/0157873 A1* | 6/2018 | Roth | G06Q 10/087 |

* cited by examiner

*Primary Examiner* — Quan Zhen Wang
*Assistant Examiner* — Rajsheed O Black-Childress
(74) *Attorney, Agent, or Firm* — Terrile, Cannatti & Chambers; Stephen A. Terrile

(57) ABSTRACT

A system and method are disclosed for automatically dispensing labels for information handling systems being assembled, in an assembly line that is configured to produce many different types of information handling systems with differing internal components. In some embodiments, a service tag identifier and parts listing are associated with each information handling system-under-assembly. The service tag identifier is written to an RFID tag that can be read at various stages of assembly. In some embodiments, when an assembly bin arrives at a label station of the assembly line, the RFID tag is read and a database is searched for the matching service tag and the associated parts listing. One or more appropriate labels are then automatically dispensed in response to the components in the listing. In this manner, correct association of labels with the components is maintained, and the search and dispensing process is performed in an efficient manner.

7 Claims, 3 Drawing Sheets

METHOD, SYSTEM, AND APPARATUS FOR AUTOMATED DISPENSING OF LABELS IN A PRODUCTION ENVIRONMENT

BACKGROUND OF THE INVENTION

Field of the Invention

The present invention relates to information handling systems. More specifically, embodiments of the invention relate to an information handling system configured to track information regarding parts contained in a system-under-assembly and to automatically dispense labels associated with one or more of the parts during the build process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Variations in information handling systems include differing processors (e.g., processor types and manufacturers), and other subsystems (e.g., video cards, storage devices, and the like). For some situations, in order to enhance customer experience or due to agreements with device manufacturers, it is desirable to include labels on the case or chassis of an information handling system indicating, for example, the type of processor and the name of the manufacturer. Selection and placement of the label may be performed prior to the information handling system being fully assembled. Therefore, selection of the label is performed referencing a parts list. But, in a typical assembly line, the time for selection of each label for each system being built can be very short. This can introduce undesirable errors in selection of the label being placed on the information handling system being built.

SUMMARY OF THE INVENTION

Systems and a method are disclosed for automatically dispensing labels for information handling systems being assembled, in an assembly line that is configured to produce many different types of information handling systems with differing internal components.

In one embodiment, a system for dispensing a label for a system-under-assembly is provided. The system includes: a network, a radio-frequency identification (RFID) writer coupled to the network, an RFID reader coupled to the network, one or more label dispensers coupled to the network, and a labeling information handling system coupled to the network. The RFID writer is located at a first stage of an assembly line and is configured to write a service tag (ST) identifier to an RFID tag associated with a bin on the assembly line. The RFID reader is located at a second stage of the assembly line and is configured to read the ST identifier from the RFID tag. The one or more label dispensers are configured to dispense a label from a roll of labels in response to a command to dispense the label. The labeling information handling system is configured to receive the ST identifier from the RFID reader, search a database for the ST identifier where the database includes one or more entries and each entry associates and ST identifier with a set of parts, identify one or more parts having associated labels in a matching entry for the ST identifier, and transmit one or more commands to dispense the associated labels to one or more label dispenser of the one or more label dispensers.

One aspect of the above embodiment further includes a product configuration information handling system coupled to the network. The product configuration information handling system is configured to generate the ST identifier for the system-under-assembly, and associate the set of parts with the ST identifier. In a further aspect, the product configuration information handling system is further configured to transmit the ST identifier and set of parts to the labeling information handling system, and the labeling information handling system is further configured to store the ST identifier and the set of parts as an entry in the database. Another aspect of the above embodiment further includes a programmable logic controller coupled to the network. The programmable logic controller is configured to control one or more of the RFID reader and the one or more label dispensers. In a further aspect, the programmable logic controller is further configured to receive the commands from the labeling information handling system, and control the one or more label dispensers in response to the label information. Another aspect of the above embodiment further includes a second RFID reader located at the first stage of the assembly line. The second RFID reader is configured to read the RFID tag for an RFID tag value where the reading occurs subsequent to the RFID writer writing the ST identifier to the RFID tag, and validating the RFID tag value by comparing the RFID tag value with the ST identifier. In another aspect of the above embodiment, the system further includes one or more visual identifiers each associated with a corresponding one of the one or more label dispensers. The labeling information handling system provides information to control the visual identifier associated with the one or more label dispensers commanded to dispense a label.

In another embodiment, a method is provided for dispensing a label for a system-under-assembly. The method includes receiving a RFID tag value, searching a database for a match of the RFID tag value where each entry of the database includes a field including an ST value and one or more fields including parts identifiers and the RFID tag value is compared to the ST values of the entries, and controlling a label dispenser in response to information in the one or more fields including parts identifiers.

In one aspect of the above embodiment, a parts identifier of the parts identifiers corresponds to a label dispensed by the label dispenser, and the controlling includes dispensing a label when the entry associated with the RFID tag value includes the parts identifier. In another aspect, the method further includes receiving an ST value and associated parts identifiers, and storing the ST value and the associated parts identifiers and entry of the database. In a further aspect, the ST value and associated parts identifiers are received from a product configuration system.

In another aspect of the above embodiment, controlling the label dispenser includes transmitting control information to a programmable logic controller coupled to the label dispenser. In a further aspect, the RFID tag value is provided by an RFID reader coupled to the programmable logic controller. In yet another aspect of the above embodiment, the label dispensers configured to dispense a label configured for attachment to a chassis of the system-under-assembly. In still another aspect of the above embodiment, the label dispenser is located at a station of an assembly line for the system-under-assembly.

Another embodiment provides a system that includes: a processor, a data bus coupled to the processor, a network interface coupled to the data bus, and a non-transitory, computer-readable storage medium embodying computer program code, the non-transitory, computer-readable storage medium is coupled to the data bus. The computer program code interacts with a plurality of computer operations and includes instructions executable by the processor and configured for: receiving, via the network interface, an RFID tag value; searching a database for a match of the RFID tag value where each entry of the database includes a field including a ST value and one or more fields including parts identifiers, and the RFID tag value is compared to the ST values of the entries; controlling, via the network interface, a label dispenser in response to information in the one or more fields including parts identifiers.

In one aspect of the above embodiment, a parts identifier of the parts identifiers corresponds to a label dispensed by the label dispenser, and the controlling includes dispensing a label when the entry associated with the RFID tag value includes the parts identifier. In another aspect, the instructions executable by the processor are further configured for receiving via the network interface an ST value and associated parts identifiers, and storing the ST value and associated parts identifiers in an entry of the database. In yet another aspect, controlling the label dispenser includes transmitting control information to a programmable logic controller coupled to the label dispenser and the system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
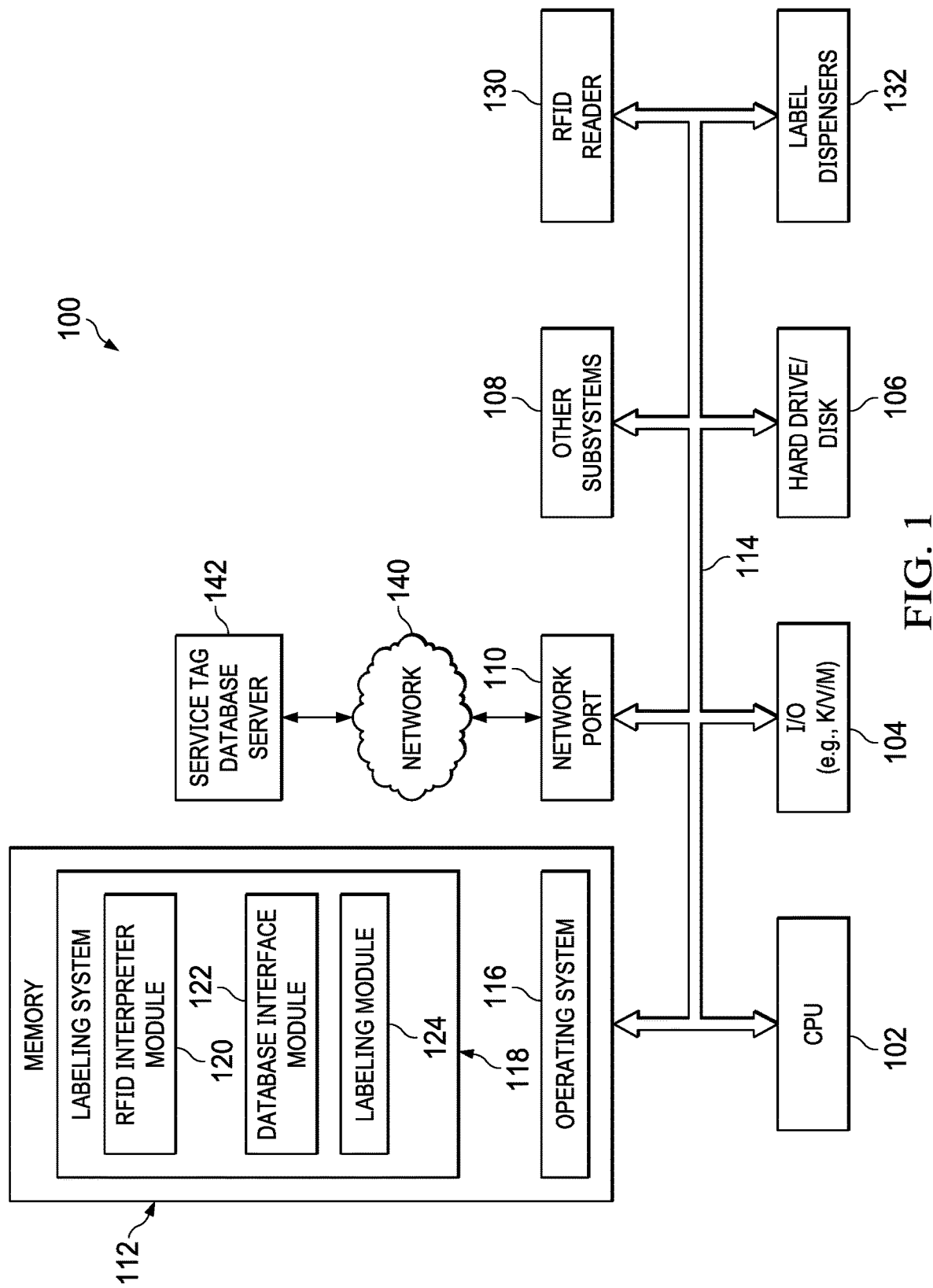
FIG. 1 shows a general illustration of components of an information handling system as implemented in the system and method of the present invention.

A system and method are disclosed for automatically dispensing labels for information handling systems being assembled, in an assembly line that is configured to produce many different types of information handling systems with differing internal components. In some embodiments, a service tag identifier and parts listing is associated with each information handling system-under-assembly. The service tag identifier is written to an RFID tag that can be read at various stages of assembly. In some embodiments, when an assembly bin arrives at a label station of the assembly line, the RFID tag is read and a database is searched for the matching service tag and the associated parts listing. One or more appropriate labels are then automatically dispensed in response to the components in the listing. In this manner, correct association of labels with the components is maintained, and the search and dispensing process is performed in an efficient manner.

In certain manufacturing processes for information handling systems, there can be many different types of systems concurrently under assembly on a single assembly line. The systems-under-assembly can have differing types of components (e.g., CPU, video processors, and the like). Thus, each system-under-assembly has a parts listing printed on a traveler that accompanies a bin into which all the parts are collected and assembled along the assembly line. This parts listing can be referred to along the assembly line, as the system-under-assembly is built.

In some circumstances, it is desirable to include an identifier of one or more of the internal components on the case or chassis of an assembled information handling system. For example, a label can be attached that identifies a manufacturer of a CPU along with a branding of the CPU. In such cases, it is important to ensure that the label correctly identifies the part.

Traditionally, labels are hand-picked by an operator along the assembly line. The operator will read the hard copy of the parts listing, select a label, and then affix the label to the case or chassis. But given the high speed of assembly lines, the operator has less than 10 seconds, typically, to perform this task. This short period can result in wrong and missing labels for some devices. There can be multiple different types of CPUs, for example, made by one manufacturer and many different labels to choose from. Or there may be multiple manufacturers' labels. Embodiments of the present invention seek to eliminate mismatching and missing labels through an automated and validated process that selects labels for each information handling system in an assembly line.

For purposes of this disclosure, an information handling system, including a system-under-assembly, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. Information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service tag database server 142, or other servers, discussed more fully below.

Information handling system 100 likewise includes system memory 112, which is interconnected to the foregoing via one or more buses 114. System memory 112 further comprises operating system (OS) 116 and in various embodiments may also comprise a labeling system module 118.

The labeling system module 118 performs operations associated with identifying a system-under-assembly in a bin at a label dispensing station of the assembly line, associating a component identifier with the identified system, and dispensing a label associated with the component identifier. As will be discussed more fully below, embodiments use an RFID interpreter module 120 in the process of identifying the system-under-assembly in the bin. RFID interpreter module 120 communicates with RFID reader 130 in the identification process. In certain embodiments, a database interface module 122 is utilized to interface with service tag database 142 to identify the components in the system-under-assembly. In certain embodiments, a labeling module 124 is used to control label dispensers 132 that are coupled to the system by bus 114, an interface coupled to the bus, or via network port 110 coupled to a controller accessible via network 140.

The operations related to label dispensing performed by labeling system module 118 improve the overall efficiency of the assembly line process, as well as improve the accuracy of the dispensed label's association with the internal components of the system-under-assembly.

As will be appreciated, once information handling system 100 is configured to perform the label dispensing operation, information handling system 100 becomes a specialized computing device specifically configured to perform the label dispensing operation and is not a general purpose computing device. Moreover, the implementation of the label dispensing operation on information handling system 100 improves the functionality of the information handling system and provides a useful and concrete result of efficiently and accurately dispensing labels.

Figure 2:
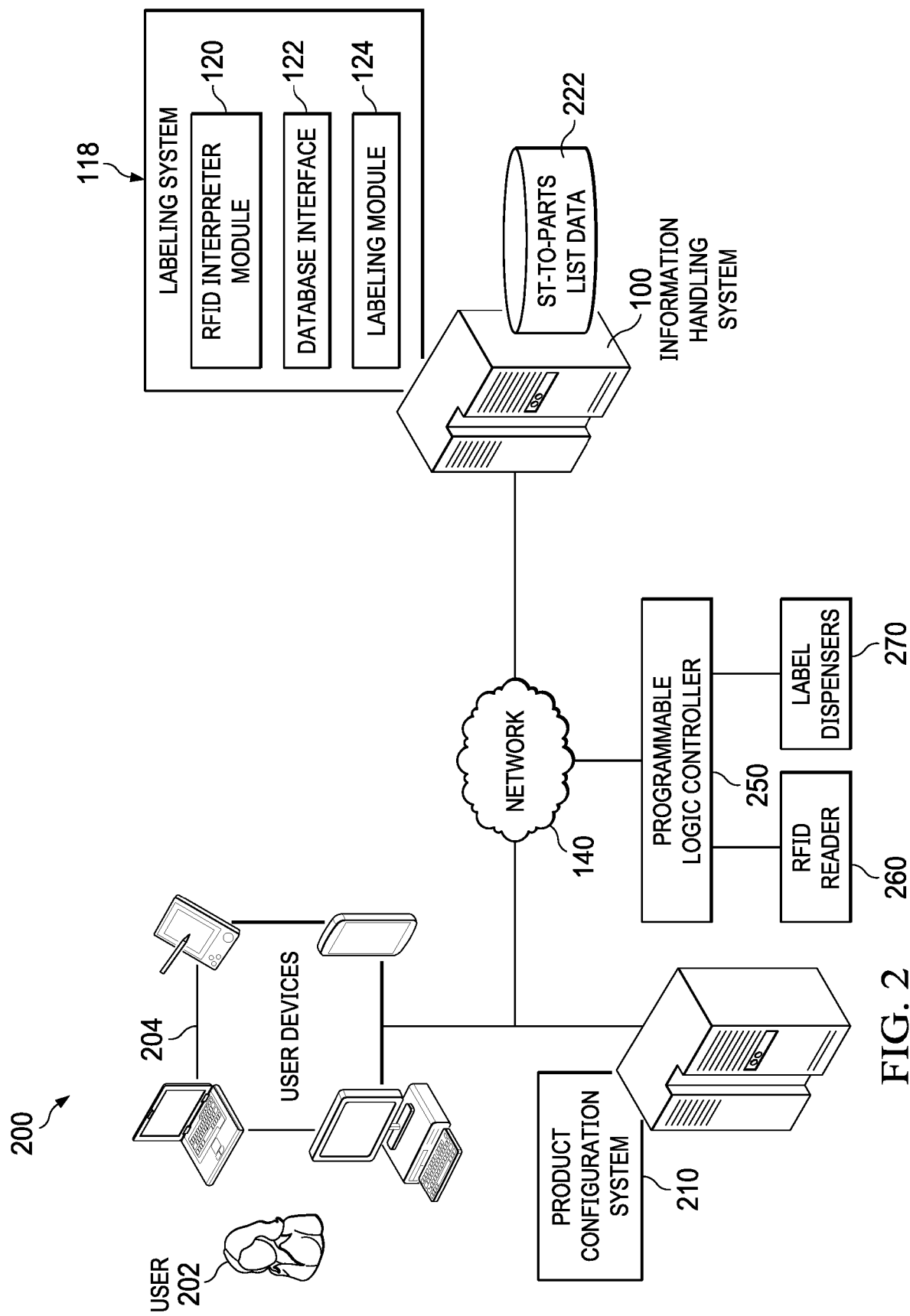
FIG. 2 is a simplified block diagram illustrating an example network environment configured to incorporate embodiments of the present invention.

FIG. 2 is a simplified block diagram illustrating an example network environment 200 configured to incorporate embodiments of the present invention. Information handling system 100, as illustrated in FIG. 1 is coupled to network 140 via, for example, network port 110. As illustrated in FIG. 2, information handling system 100 is coupled to service tag (ST)-to-parts list data 222. ST-to-parts list data 222 can take the form of a database with entries for unique ST numbers associated with systems-under-assembly associated with a parts listing for that system-under-assembly.

Product configuration system 210 is another information handling system coupled to information handling system 100 via network 140. Product configuration system 210 is involved with an early stage of an assembly line for building configurable systems under assembly. Product configuration system 210 can generate unique ST identifiers for each system-under-assembly at the assembly line. In addition, product configuration system 210 can associate the unique ST identifier for a system-under-assembly with a parts listing for the system being assembled. The parts listing can be typed or scanned-in to the product configuration system. A user 202 can provide the parts listing using a user device 204, which can include a mobile device, laptop computer, desktop computer, and the like. Product configuration system 210 can provide the ST identifier along with the associated parts listing to information handling system 100 for storing in ST-to-parts list database 222. Product configuration system 210 can also print the parts listing as a traveler to accompany a bin into which the parts will be provided for further assembly, along with a scannable image of the ST identifier.

At an early stage of the assembly line, an RFID tag is provided to the bin into which the parts will be collected for the system-under-assembly. The ST identifier is scanned at this stage and an RFID writer is used to write the ST identifier value to the RFID tag. The scanner or RFID writer can be one of user devices 204, or another device either coupled to a network 140 or independent thereof. As part of the RFID writing process, validation can be made to determine whether the ST identifier has been properly written to the RFID tag. This can be done, for example, by reading the RFID tag multiple times to ensure correspondence with the ST identifier.

As discussed above, one step of the assembly line process can involve dispensing labels to be affixed to a chassis or case of the system-under-assembly. At a station performing the step of the process, an RFID reader 260 can be used to read the RFID tag associated with the bin of the system-under-assembly. The ST identifier read from the RFID tag can be provided to a programmable logic controller 250, for example, which can be configured to validate the ST identifier (e.g., by reading the RFID tag multiple times). The programmable logic controller can provide the ST identifier to information handling system 100 using network 140, or by being directly coupled to information handling system 100.

As will be discussed more fully below, information handling system 100 determines the internal components associated with the ST identifier read from the bin. The information handling system can then determine which label or labels are associated with the components for the system-under-assembly and provides that information back to programmable logic controller 250. Programmable logic controller 250 can then instruct label dispensers 272 provide the appropriate label for the system-under-assembly. In some embodiments, programmable logic controller 250 can also activate an indicator associated with a particular label dispenser in order to aid an operator of the label dispensing system. In some embodiments, label dispensers 270 and RFID reader 260 can be coupled directly to information handling system 100, rather than using a programmable logic controller.

Figure 3:
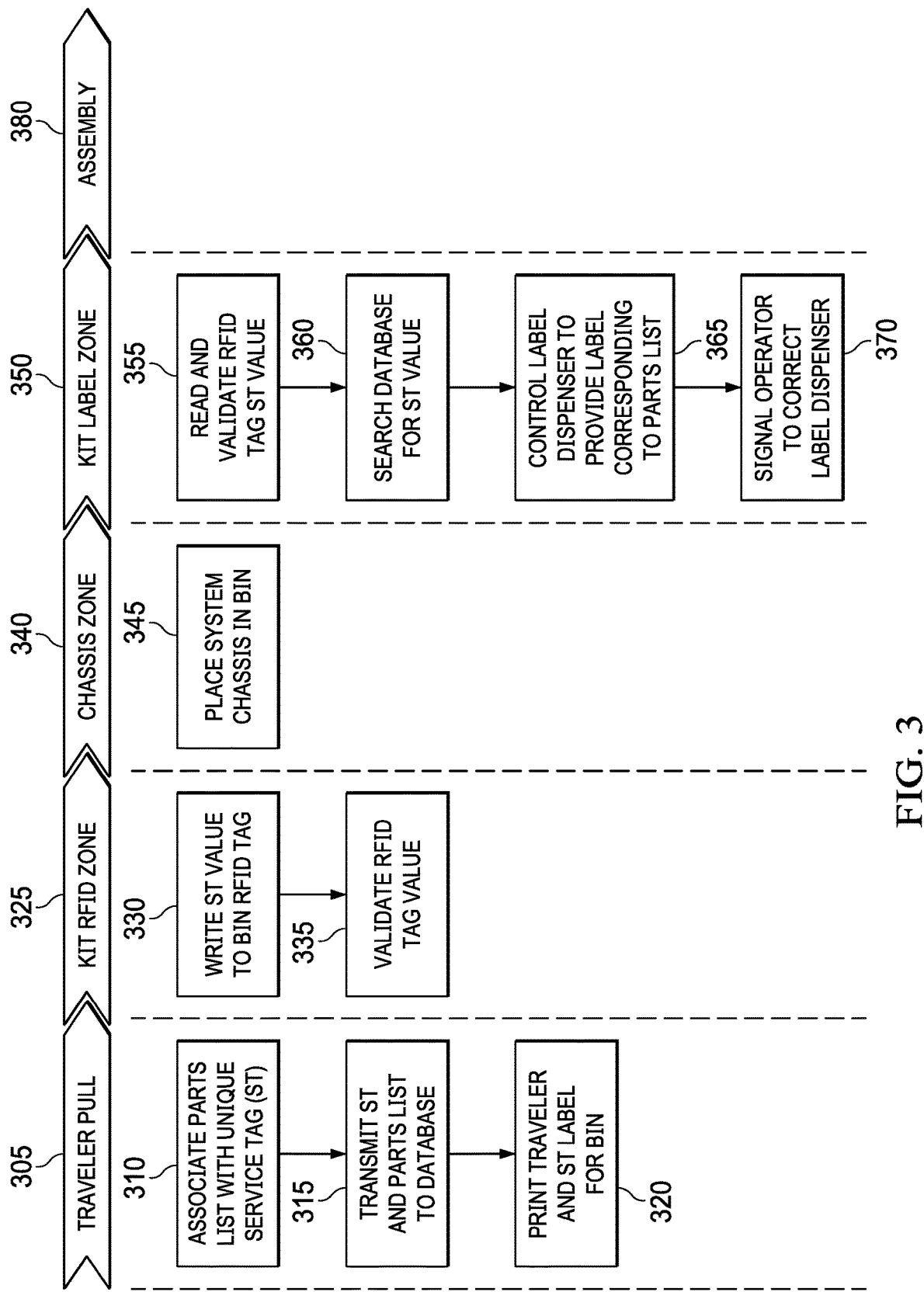
FIG. 3 is a simplified block diagram illustrating a process flow of an assembly line incorporating some embodiments of the present invention.

FIG. 3 is a simplified block diagram illustrating a process flow 300 of an assembly line incorporating some embodiments of the present invention. The top of the process flow diagram illustrates selected stages of an assembly line flow for assembling an information handling system. At traveler pull stage 305, a parts list is associated with a unique service tag (ST) for the system-under-assembly (e.g., by product configuration system 210) (310). The ST and parts list are transmitted to information handling system 100 for storage in the ST-to-parts list database (e.g., 222) (315). In addition, the ST label and a traveler incorporating the parts listing is printed for transport with a bin into which the parts for the system being assembled can be gathered (320). The transmitting of the ST and parts list and the printing can be performed, for example, by product configuration system 210.

At a subsequent stage of the assembly line, and RFID tag can be associated with the bin (e.g., at kit RFID zone 325). At this stage, the ST identifier value can be read from the printed ST label and written to an RFID tag associated with the bin (330). Reading of the ST identifier value can be performed using a scanner, where the ST label can include, for example, a barcode or a QR code. Once the RFID tag is written to, the information on the RFID tag can be validated to ensure that the data on the RFID tag matches the ST value (335). Validation can include, for example, reading the RFID tag multiple times and ensuring that the read value matches the ST identifier value.

A subsequent stage of the assembly line is a "chassis zone" 340, at which point a chassis for the system being assembled is placed in the bin (345). In some embodiments, this chassis will be labeled by the dispensed labels in a following step.

A subsequent stage of the assembly line is a "kit label zone" 350 at which labels for the system-under-assembly are dispensed, in accord with embodiments of the present invention. At this stage, the RFID tag associated with the bin is read to obtain the ST value stored on the RFID tag (355). The ST value can be verified by reading the RFID tag multiple times using an RFID reader (e.g., 260) coupled to a programmable logic controller (e.g., 250). If one or more of the validation reads do not agree, then the system can flag the bin for operator involvement. Once obtained, the ST value can be provided to information handling system 100 for a search in ST-to-parts list database 222 for a matching entry (360).

The matching entry in the database has a parts listing including one or more components associated with dispensable labels at kit label zone 350. Information handling system 100 can then provide information to programmable logic controller 250 to control a label dispenser 270 in order to provide a label for the system-under-assembly (365). In addition, information can be provided to the programmable logic controller to direct an operator of the label dispensing station to the appropriate dispenser (370). After the kit label zone stage, the bin proceeds to further assembly stages at which the system-under-assembly continues to be built (380).

It should be appreciated that embodiments of the present disclosure provide an efficient and accurate mechanism for dispensing labels in an assembly line environment. Embodiments can serve to eliminate wrong or missed scanning issues associated with traditional labeling systems. The improved accuracy can further serve to enhance customer experience with the ultimately assembled system-under-assembly, as the labels will reflect the components within the system. In addition, the enhanced speed of the process (e.g., six seconds or less) serves to improve the overall speed of the assembly line.

As will be appreciated by one skilled in the art, the present invention may be embodied as a method, system, or computer program product. Accordingly, aspects of the invention may be implemented in hardware, in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that one or more blocks of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function or act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A system for dispensing a label for a system-under-assembly, the system comprising:
   a network;
   a radio-frequency identification (RFID) writer, coupled to the network, at a first stage of an assembly line, and configured to write a service tag (ST) identifier to an RFID tag associated with a bin on the assembly line;
   an RFID reader, coupled to the network, at a second stage of the assembly line, and configured to read the ST identifier from the RFID tag;
   one or more label dispensers, coupled to the network, and each label dispenser configured to dispense a label from a roll of labels in response to a command to dispense the label; and
   a labeling information handling system, coupled to the network, and configured to receive the ST identifier from the RFID reader,
      search a database for the ST identifier, wherein the database comprises one or more entries, each entry associating an ST identifier with a set of parts,
      identify one or more parts having associated labels in a matching entry for the ST identifier, and
      transmit one or more commands to dispense the associated labels to one or more label dispenser of the one or more label dispensers.

2. The system of claim 1 further comprising:
   a product configuration information handling system, coupled to the network, and configured to
      generate the ST identifier for the system-under-assembly, and
      associate the set of parts with the ST identifier.

3. The system of claim 2 wherein
   the product configuration information handling system is further configured to transmit the ST identifier and set of parts to the labeling information handling system, and
   the labeling information handling system is further configured to store the ST identifier and set of parts as an entry in the database.

4. The system of claim 1 further comprising:
   a programmable logic controller, coupled to the network, and configured to control one or more of the RFID reader and the one or more label dispensers.

5. The system of claim 4 wherein the programmable logic controller is further configured to
   receive the commands from the labeling information handling system, and
   control the one or more label dispensers in response to the label information.

6. The system of claim 1 further comprising:
   a second RFID reader, at the first stage of the assembly line, and configured to
      read the RFID tag for an RFID tag value, wherein said reading occurs subsequent to the RFID writer writing the ST identifier to the RFID tag, and
      validating the RFID tag value by comparing the RFID tag value with the ST identifier.

7. The system of claim 1 further comprising:
   one or more visual identifiers, each visual identifier associated with a corresponding one of the one or more label dispensers, wherein
      the labeling information handling system provides information to control the visual identifier associated with the one or more label dispensers commanded to dispense a label.

* * * * *